(12) United States Patent
Fritzsche et al.

(10) Patent No.: US 9,336,108 B2
(45) Date of Patent: May 10, 2016

(54) SCALABLE TEST PLATFORM

(71) Applicant: LTX-Credence Corporation, Norwood, MA (US)

(72) Inventors: William A. Fritzsche, Morgan Hill, CA (US); Jeffery D. Currin, Livermore, CA (US); Russell Elliott Poffenberger, Discovery Bay, CA (US); Timothy Alton, Gilroy, CA (US); Michael Gordon Davis, San Jose, CA (US)

(73) Assignee: Xcerra Corporation, Norwood, MA (US)

( * ) Notice: Subject to any disclaimer, the term of this patent is extended or adjusted under 35 U.S.C. 154(b) by 503 days.

(21) Appl. No.: 13/749,332

(22) Filed: Jan. 24, 2013

(65) Prior Publication Data

US 2014/0207404 A1    Jul. 24, 2014

(51) Int. Cl.
| | | |
|---|---|---|
| *G06F 11/263* | (2006.01) | |
| *G06F 11/36* | (2006.01) | |
| *G06F 9/44* | (2006.01) | |
| *G06F 9/445* | (2006.01) | |
| *G07C 3/00* | (2006.01) | |
| *G07C 3/08* | (2006.01) | |

(52) U.S. Cl.
CPC ............ *G06F 11/263* (2013.01); *G06F 8/20* (2013.01); *G06F 8/665* (2013.01); *G06F 11/3664* (2013.01); *G07C 3/00* (2013.01); *G07C 3/08* (2013.01)

(58) Field of Classification Search
CPC ... G06F 8/665; G06F 11/263; G06F 11/3664; G06F 8/20; G07C 3/08; G07C 3/00
USPC .......... 702/117, 119, 123; 714/4.1, 21, 38.14, 714/49, 32, 37, 724
See application file for complete search history.

(56) References Cited

U.S. PATENT DOCUMENTS

| | | | |
|---|---|---|---|
| 4,397,021 A | 8/1983 | Lloyd et al. | |
| 4,975,836 A | 12/1990 | Hirosawa et al. | |
| 6,078,970 A | 6/2000 | Nordstrom et al. | |
| 6,085,278 A | 7/2000 | Gates et al. | |
| 6,107,818 A | 8/2000 | Czamara | |
| 6,615,374 B1 | 9/2003 | Moran | |
| 6,985,977 B2 | 1/2006 | Vrancic | |
| 7,024,613 B2 | 4/2006 | Carnevale et al. | |
| 7,027,808 B2 * | 4/2006 | Wesby .......................... | 455/419 |
| 7,133,943 B2 | 11/2006 | Carnevale et al. | |
| 7,225,364 B2 | 5/2007 | Carnevale et al. | |

(Continued)

OTHER PUBLICATIONS

DSS Networks, Inc., GIGPC-Express Switch Model 6468, DSS Networks, Inc., 2005 DSS Networks, Inc.; DS: pbl 64780 02/05.*

(Continued)

*Primary Examiner* — Carol S Tsai
(74) *Attorney, Agent, or Firm* — Brian J. Colandreo; Michael T. Abramson; Holland & Knight LLP

(57) ABSTRACT

A method, computer program product, and computing system for, upon the occurrence of a computer-related event, comparing code utilized by one or more subsystems included within a scalable test platform to code available from a remote location. If the code available from the remote location is newer than the code utilized by one or more subsystems, the code available from the remote location is obtained, thus defining newer code. The code utilized by one or more subsystems is updated with the newer code.

18 Claims, 5 Drawing Sheets

(56) References Cited

U.S. PATENT DOCUMENTS

| | | | |
|---|---|---|---|
| 7,251,690 B2 | 7/2007 | Williams | |
| 7,266,083 B2 | 9/2007 | Carnevale et al. | |
| 7,340,364 B1 | 3/2008 | Kumaki | |
| 7,389,496 B2 | 6/2008 | Eckhart et al. | |
| 7,484,016 B2 | 1/2009 | Shah et al. | |
| 7,502,708 B2 | 3/2009 | Kumaki | |
| 7,627,697 B2 | 12/2009 | Saito | |
| 7,676,713 B2* | 3/2010 | Holmqvist | 714/724 |
| 7,908,052 B2 | 3/2011 | Howlett | |
| 7,908,531 B2 | 3/2011 | Fairbanks et al. | |
| 8,001,542 B2* | 8/2011 | Edwards et al. | 717/176 |
| 8,006,241 B2* | 8/2011 | Dias | 717/174 |
| 8,032,669 B2 | 10/2011 | Puri et al. | |
| 8,166,341 B2* | 4/2012 | DeHaan et al. | 714/21 |
| 8,434,068 B2* | 4/2013 | Wrighton et al. | 717/131 |
| 8,718,967 B2* | 5/2014 | Filler et al. | 702/119 |
| 8,775,113 B2* | 7/2014 | Powers et al. | 702/117 |
| 8,788,882 B2 | 7/2014 | Schroeder et al. | |
| 8,832,622 B1* | 9/2014 | Xu et al. | 716/112 |
| 8,874,953 B2* | 10/2014 | Tseng et al. | 714/4.1 |
| 2002/0188853 A1* | 12/2002 | Owhadi | 713/182 |
| 2003/0221042 A1* | 11/2003 | Watkins et al. | 710/316 |
| 2005/0132354 A1* | 6/2005 | Edwards et al. | 717/174 |
| 2005/0149341 A1* | 7/2005 | Eguchi et al. | 705/1 |
| 2005/0188140 A1 | 8/2005 | Hitchcock et al. | |
| 2005/0222933 A1* | 10/2005 | Wesby | 705/36 |
| 2006/0075001 A1* | 4/2006 | Canning et al. | 707/203 |
| 2006/0259656 A1* | 11/2006 | Sullivan | 710/22 |
| 2007/0101215 A1* | 5/2007 | Holmqvist | 714/724 |
| 2008/0005258 A1 | 1/2008 | Sridharan et al. | |
| 2008/0320466 A1* | 12/2008 | Dias | 717/171 |
| 2010/0107146 A1* | 4/2010 | Wrighton et al. | 717/134 |
| 2010/0131692 A1 | 5/2010 | Nishizawa et al. | |
| 2010/0238037 A1 | 9/2010 | Bristow et al. | |
| 2011/0029709 A1 | 2/2011 | Feiereisel et al. | |
| 2011/0040920 A1 | 2/2011 | Chou et al. | |
| 2011/0041105 A1 | 2/2011 | Chou et al. | |
| 2011/0055636 A1* | 3/2011 | DeHaan et al. | 714/37 |
| 2012/0191402 A1* | 7/2012 | Filler et al. | 702/119 |
| 2012/0311597 A1 | 12/2012 | Manula et al. | |
| 2013/0111505 A1 | 5/2013 | Frick et al. | |
| 2013/0219355 A1 | 8/2013 | Brown et al. | |
| 2013/0339803 A1 | 12/2013 | Vandervalk et al. | |
| 2014/0137082 A1 | 5/2014 | Ellis et al. | |
| 2014/0143600 A1 | 5/2014 | Hutner et al. | |
| 2014/0173147 A1 | 6/2014 | Grafton et al. | |
| 2014/0208082 A1 | 7/2014 | Fritzsche et al. | |
| 2014/0208160 A1 | 7/2014 | Fritzsche et al. | |
| 2014/0208161 A1 | 7/2014 | Fritzsche et al. | |
| 2014/0208164 A1 | 7/2014 | Fritzsche et al. | |

OTHER PUBLICATIONS

Microsoft Corporation, Microsoft Computer Dictionary, 2002, Microsoft Press, Fifth Edition, p. 48.
Non-Final Office Action issued in related U.S. Appl. No. 13/749,641 on Dec. 19, 2014.
Non-Final Office Action issued in related U.S. Appl. No. 13/749,199 on Jan. 7, 2015.
Non-Final Office Action issued in related U.S. Appl. No. 13/749,260 on Jan. 5, 2015.
Non-Final Office Action issued in related U.S. Appl. No. 13/749,308 on Dec. 4, 2014.
Notice of Allowance issued in related U.S. Appl. No. 13/749,641 on Aug. 11, 2015.
PLX Technology, Express Apps, 2005, PLX Technology, Issue No. 10.
Final Office Action issued in related U.S. Appl. No. 13/749,641 on Apr. 15, 2015.
Final Office Action issued in related U.S. Appl. No. 13/749,199 on Apr. 14, 2015.
Final Office Action issued in related U.S. Appl. No. 13/749,260 on Apr. 15, 2015.
Final Office Action issued in related U.S. Appl. No. 13/749,308 on Apr. 15, 2015.
Non-Final Office Action issued in related U.S. Appl. No. 13/749,199 on Oct. 5, 2015.
Non-Final Office Action issued in related U.S. Appl. No. 13/749,260 on Oct. 16, 2015.
Non-Final Office Action issued in related U.S. Appl. No. 13/749,308 on Oct. 19, 2015.
DSS Networks, Inc., GIGPCI-Express Switch Model 6468, DSS Networks, Inc., 2005 DSS Networks, Inc.; DS: pb164780 02/05.
Final Office Action Dated Feb. 25, 2016 received in related U.S. Appl. No. 13/749,199.
Final Office Action Dated Mar. 2, 2016 received in related U.S. Appl. No. 13/749,260.
Final Office Action Dated Mar. 1, 2016 received in related U.S. Appl. No. 13/749,308.

* cited by examiner

SCALABLE TEST PLATFORM

TECHNICAL FIELD

This disclosure relates to automated test equipment and, more particularly, to scalable automated test equipment.

BACKGROUND

Automated test equipment systems may be used to test various electronic components, which are often referred to as devices under test. Such systems may automate the testing of such components, wherein a component may be subjected to a battery of different tests in some form of logical fashion. Additionally, such systems may provide further levels of automation, wherein the components being tested are automatically swapped out (upon completion of a testing procedure) and replaced with a component that is yet to be tested. Unfortunately, such automated test equipment systems are often rigid in nature and proprietary in their design, resulting in systems that are not easily adaptable/scalable.

SUMMARY OF DISCLOSURE

In one implementation, a computer-implemented method includes, upon the occurrence of a computer-related event, comparing code utilized by one or more subsystems included within a scalable test platform to code available from a remote location. If the code available from the remote location is newer than the code utilized by one or more subsystems, the code available from the remote location is obtained, thus defining newer code. The code utilized by one or more subsystems is updated with the newer code.

One or more of the following features may be included. The computer-related event may include the occurrence of a booting procedure. The computer-related event may include the occurrence of an update procedure. The newer code may include a firmware update for the one or more subsystems. The newer code may include a driver update for the one or more subsystems.

Obtaining the code available from the remote location may include obtaining the code from a remote website via the internet. The scalable test platform may include a PCIe-based event fabric; one or more CPU subsystems coupled to the PCIe-based event fabric and configured to execute an automated test process; and one or more instrument subsystems coupled to the PCIe-based event fabric and configured to interface one or more devices under test.

In another implementation, a computer program product resides on a computer readable medium that has a plurality of instructions stored on it. When executed by a processor, the instructions cause the processor to perform operations including, upon the occurrence of a computer-related event, comparing code utilized by one or more subsystems included within a scalable test platform to code available from a remote location. If the code available from the remote location is newer than the code utilized by one or more subsystems, the code available from the remote location is obtained, thus defining newer code. The code utilized by one or more subsystems is updated with the newer code.

One or more of the following features may be included. The computer-related event may include the occurrence of a booting procedure. The computer-related event may include the occurrence of an update procedure. The newer code may include a firmware update for the one or more subsystems. The newer code may include a driver update for the one or more subsystems.

Obtaining the code available from the remote location may include obtaining the code from a remote website via the internet. The scalable test platform may include a PCIe-based event fabric; one or more CPU subsystems coupled to the PCIe-based event fabric and configured to execute an automated test process; and one or more instrument subsystems coupled to the PCIe-based event fabric and configured to interface one or more devices under test.

In another implementation, a computing system includes at least one processor and at least one memory architecture coupled with the at least one processor, wherein the computing system is configured to perform operations including, upon the occurrence of a computer-related event, comparing code utilized by one or more subsystems included within a scalable test platform to code available from a remote location. If the code available from the remote location is newer than the code utilized by one or more subsystems, the code available from the remote location is obtained, thus defining newer code. The code utilized by one or more subsystems is updated with the newer code.

One or more of the following features may be included. The computer-related event may include the occurrence of a booting procedure. The computer-related event may include the occurrence of an update procedure. The newer code may include a firmware update for the one or more subsystems. The newer code may include a driver update for the one or more subsystems.

Obtaining the code available from the remote location may include obtaining the code from a remote website via the internet. The scalable test platform may include a PCIe-based event fabric; one or more CPU subsystems coupled to the PCIe-based event fabric and configured to execute an automated test process; and one or more instrument subsystems coupled to the PCIe-based event fabric and configured to interface one or more devices under test.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

System Overview

Figure 1:
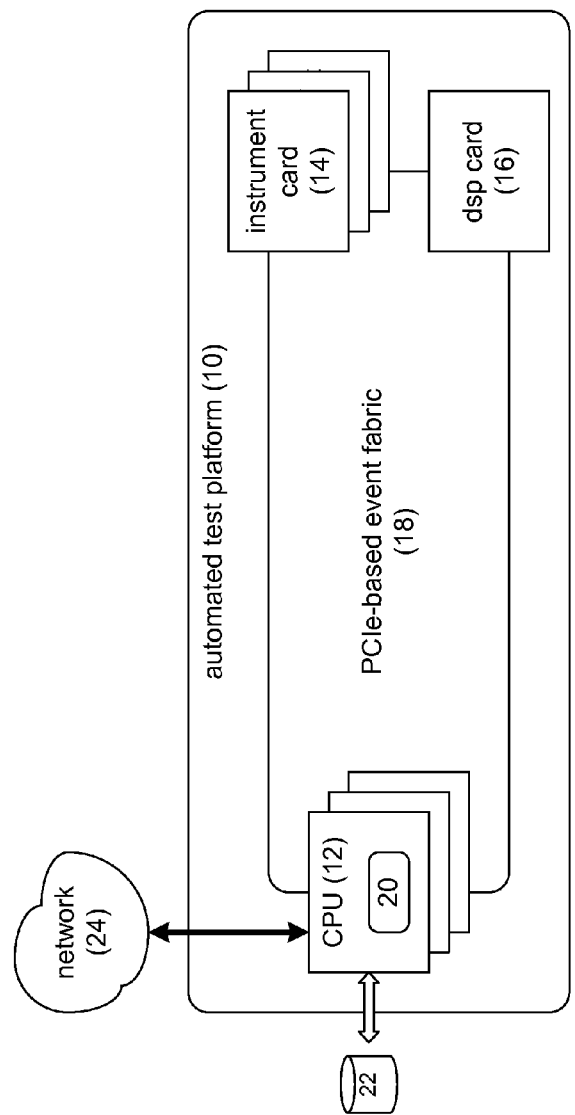
FIG. 1 is a diagrammatic view of an automated test platform.

Referring to FIG. 1, there is shown automated test platform 10. Examples of automated test platform 10 may include, but are not limited to, systems that automate the verification and validation of devices under test (DUTs). As discussed above, automated test equipment systems (e.g. automated test platform 10) may be used to test various electronic components in an automated fashion. Typically, the devices under test are subjected to a battery of different tests, wherein the testing procedures are automated in a logical fashion. For example, during the testing of a power supply, the power supply may be subjected to varying voltage levels and varying voltage frequencies. Further, during the testing of a noise canceling circuit, such a circuit may be subjected to varying levels and frequencies of noise to confirm the satisfactory performance of the same.

Automated test platform 10 may include one or more central processing units (e.g. CPU subsystem 12), one or more instrument subsystems (e.g. instrument card 14), and one or more digital signal processing subsystems (e.g. DSP card 16), all of which may be coupled together via a PCIe-based event fabric 18.

Examples of CPU subsystem 12 may include but are not limited to a personal computer, a server computer, a series of server computers, a mini computer or a single-board computer. CPU subsystem 12 may execute one or more operating systems, examples of which may include but are not limited to: Microsoft Windows XP Server™; Novell Netware™; Redhat Linux™, Unix, or a custom operating system, for example. While in this particular example, automated test platform 10 is shown to include three CPU subsystems, this is for illustrative purposes only and is not intended to be a limitation of this disclosure, as other configurations are possible. For example, the number of CPU subsystems utilized within automated test platform 10 may be increased or decreased depending upon the anticipated loading of automated test platform 10.

CPU subsystem 12 may execute one or more automated test programs (e.g. automated test process 20), wherein automated test process 20 may be configured to automate the testing of various devices under test. Through the use of automated test process 20, an administrator (not shown) of automated test platform 10 may define and execute testing procedures/routines for the various devices under test.

The instruction sets and subroutines of automated test process 20, which may be stored on storage device 22 included within CPU subsystem 12, may be executed by one or more processors (not shown) and one or more memory architectures (not shown) included within CPU subsystem 12. Storage device 22 may include but is not limited to: a hard disk drive; a tape drive; an optical drive; a RAID device; a random access memory (RAM); a read-only memory (ROM); and all forms of flash memory storage devices.

CPU subsystem 12 may be connected to one or more networks (e.g., network 24), examples of which may include but are not limited to: a local area network, a wide area network, an intranet or the internet, for example. Accordingly, CPU subsystem 12 may be administered and/or controlled via network 24. Accordingly, an administrator (not shown) may use a remote computer (not shown) coupled to network 24 to define and/or administer various testing procedures and/or routines via automated test process 20. Additionally and as we discussed below in greater detail, CPU subsystem 12 may use network 24 to obtain updated versions of drivers and/or firmware to maintain current automated test platform 10.

Figure 2:
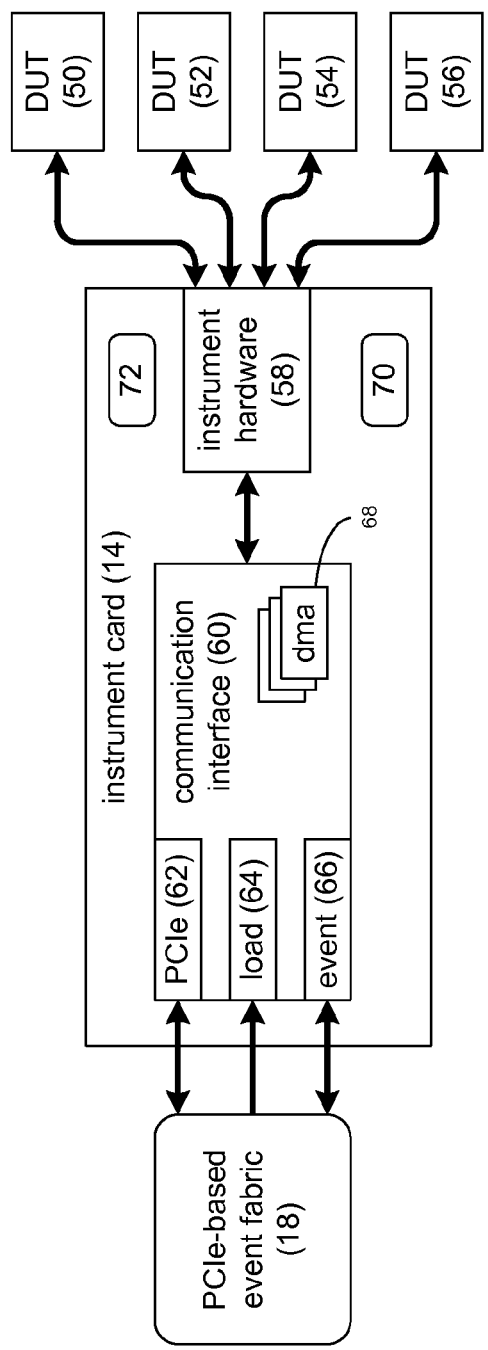
FIG. 2 is a diagrammatic view of an instrument card included within the automated test platform of FIG. 1.

Referring also to FIG. 2, there is shown a more detailed view of instrument card 14. While in this particular example, this detailed view concerns instrument card 14, this is for illustrative purposes only and is not intended to be a limitation of this disclosure, as FIG. 2 is intended to represent a generic description of an instrument card.

As discussed above, automated test platform 10 may be used to test various devices under test. For example, assume for illustrative purposes that instrument card 14 is being used to test devices under test 50, 52, 54, 56. Instrument card 14 may include instrument hardware 58. Specifically, different instrument cards may be designed to perform different functions. For example, certain instrument cards may provide varying levels of voltage, other instrument cards may provide sweeping noise signals, wherein other instrument cards may provide digital clock signals. Accordingly, depending upon the type of functionality that a specific instrument card is designed to perform, the instrument hardware (e.g. instrument hardware 58) included within the specific instrument card may vary.

Further, the manner in which instrument hardware 58 is coupled to (in this example) devices under test 50, 52, 54, 56 may vary depending upon the functionality of instrument card 14. For example, if instrument card 14 is designed to read a particular data register within a device under test, a parallel or serial data cable may be used to couple instrument hardware 58 with the device under test. In the event that instrument card 14 is being used to monitor e.g. voltage levels at a particular terminal within a device under test, a voltage probe may be used to couple instrument hardware 58 to the device under test.

Instrument card 14 may include communication interface system 60. Communication interface system 60 may be configured to couple instrument hardware 58 (and instrument card 14 generally) to PCIe-based event fabric 18. Communication interface system 60 may include various components that allow for the communication of instrument card 14 via PCIe-based event fabric 18.

For example, communication interface system 60 may include PCIe interface 62, which may allow for instrument card 14 to communicate via PCIe-based event fabric 18 using the PCIe communication standards. As is known in the art, PCIe (Peripheral Component Interconnect Express) is a high-speed serial computer expansion bus standard designed to replace the older bus systems (e.g., PCI, PCI-X, and AGP). Through the use of PCIe, higher maximum system bus throughput may be achieved. Other benefit may include lower I/O pin count, a smaller physical footprint, better performance-scaling for bus devices, a more detailed error detection and reporting mechanism, and native plug-n-play functionality.

Communication interface system 60 may further include loader interface 64 (for updating the various components of instrument card 14; to be discussed below in greater detail) and event interface 66 (for orchestrating testing procedures; to be discussed alone greater detail). Additionally and as we discussed below in greater detail, communication interface system 60 may include one or more direct memory access (DMA) engines (e.g. DMA engine 68) that may be configured to allow instrument card 14 to read data from and/or write data to remote memory systems (such as memory systems utilized by e.g. CPU subsystem 12 or other subsystems). PCIe interface 62, loader interface 64 and/or event interface 66 may be configured to communicate with PCIe-based event fabric 18.

Figure 3:
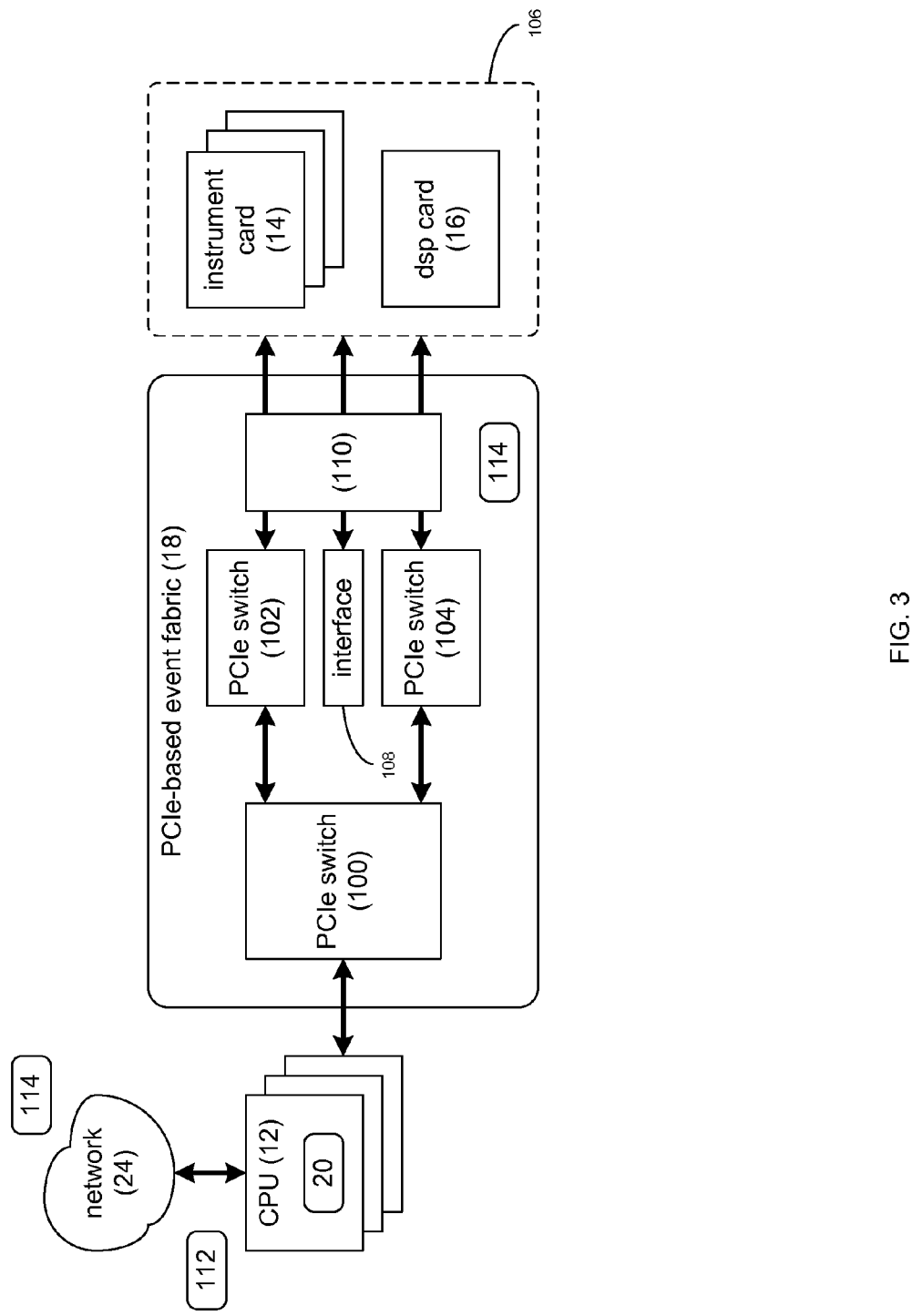
FIG. 3 is a diagrammatic view of a PCIe-based event fabric included within the automated test platform of FIG. 1.

Referring also to FIG. 3, there is shown a more detailed view of PCIe-based event fabric 18. PCIe-based event fabric 18 may include one or more PCIe switches (e.g. PCIe switches 100, 102, 104) that may be configured to interface e.g. CPU subsystem 12 with instrument card 14/DSP card 16. Examples of PCIe switches 100, 102, 104 may include but are not limited to switches available from PLX Technology (e.g., PEX8664, PEX8764, PEX8696 and PEX8796) and switches available from IDT (e.g., 89H64H16G2, 89H64H16G3, 89H48H12G2 and 89H48H12G3). For example, a first PCIe switch (e.g. PCIe switch 100) may be coupled to CPU subsystem 12. PCIe switch 100 may be coupled to PCIe switches 102, 104, which may be coupled to the expansion cards 106 included within automated test platform 10. Examples of expansion cards 106 may include but are not limited to instrument card 14 and DSP card 16.

Additionally, PCIe-based event fabric 18 may include interface 108 for communicating with loader interface 64 and event interface 66 (to be discussed below in greater detail). Further, PCIe-based event fabric 18 may include PCIe backplane 110, which may include a plurality of slots (not shown) for electrically coupling devices to PCIe backplane 110 via card edge type connections. Further, PCIe backplane 110 may include a plurality of socket type connectors (not shown) for electrically coupling devices to PCIe backplane 110 via cable type connections.

Since PCIe-based event fabric 18 uses the PCIe communication standards, enhanced levels of data throughput may be realized by automated test platform 10. Specifically and as is known in the art, within a PCIe-based system (such as automated test platform 10), data may be transferred via paired point-to-point serial links (called communication lanes), thus allowing for data to be simultaneously transferred in both directions between PCI-e devices. Additionally, such a configuration may also allow for multiple devices within the PCIe-based system to simultaneously communicate with each other. Further, PCIe slots/connectors may contain 1-32 communication lanes (based upon powers of two). Accordingly, a specific PCIe-based slot/connector may be assigned 1, 2, 4, 8, 16 or 32 lanes, thus allowing the designer to adjust the bandwidth provided to a specific slot/connector by varying the number of communication lanes assigned to the same.

Figure 4:
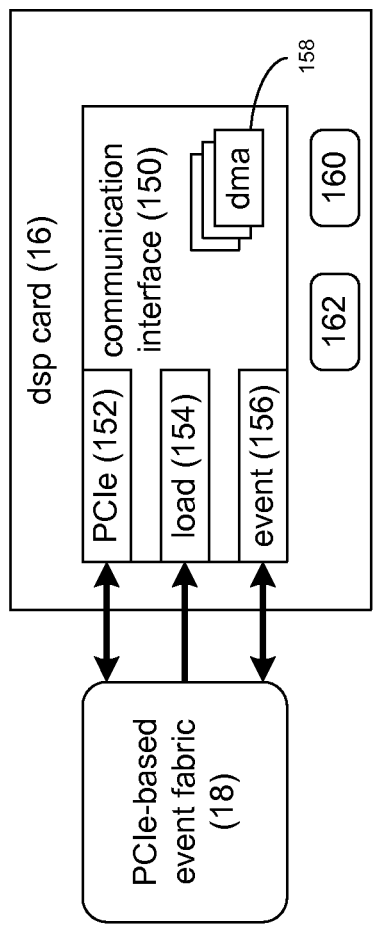
FIG. 4 is a diagrammatic view of a DSP card included within the automated test platform of FIG. 1.

Referring also to FIG. 4, there is shown a more detailed view of DSP card 16. DSP card 16 may include communication interface system 150. Communication interface system 150 may be configured to couple DSP card 16 to PCIe-based event fabric 18. Communication interface system 150 may include various components that allow for the communication of DSP card 16 via PCIe-based event fabric 18.

For example, communication interface system 150 may include PCIe interface 152, which may allow for DSP card 16 to communicate via PCIe-based event fabric 18 using the PCIe communication standards. Communication interface system 60 may further include loader interface 154 (for updating the various components of DSP card 16; to be discussed below in greater detail) and event interface 156 (for orchestrating testing procedures; to be discussed alone greater detail). Additionally and as will be discussed below in greater detail, communication interface system 150 may include one or more direct memory access (DMA) engines (e.g. DMA engine 158) that may be configured to allow DSP card 16 to read data from and/or write data to remote memory systems (such as memory systems utilized by e.g. CPU subsystem 12 or other subsystems). PCIe interface 152, loader interface 154 and/or event interface 156 may be configured to communicate with PCIe-based event fabric 18.

Operation:

As discussed above, automated test platform 10 may be used to test various electronic components. CPU subsystem 12 may execute one or more automated test programs (e.g. automated test process 20), wherein automated test process 20 may be configured to automate the testing of e.g., devices under test 50, 52, 54, 56. Through the use of automated test process 20, an administrator (not shown) of automated test platform 10 may define testing procedures/routines for devices under test 50, 52, 54, 56. Once automated test process 20 defines these testing procedures/routines, testing instructions (e.g., instructions 112) may be defined and stored locally on a memory system (not shown) accessible by CPU subsystem 12.

Instructions 112 may instruct the subsystems (e.g. instrument card 14/DSP card 16) to perform various operations. For example, instrument card 14 may obtain instructions 112 via e.g., DMA engine 68. As discussed above, DMA engine 68 may be configured to allow instrument card 14 to read data from and/or write data to remote memory systems (such as memory systems utilized by e.g. CPU subsystem 12 or other instrument cards). Accordingly, CPU subsystem 12 may notify the various subsystems (e.g., instrument card 14/DSP card 16) that instructions 112 are available and e.g., instrument card 14 may obtain instructions 112 from the memory system accessible by CPU subsystem 12 via DMA engine 68.

Once instructions 112 are obtained by (in this example) instrument card 14, the testing procedure may begin. For example, instrument card 14 may provide one or more variable input signals to device under test 50 while monitoring one or more output signals provided by device under test 50. The output signals provided by device under test 50 (e.g., captured test data 70) may be stored within a memory subsystem (not shown) included within instrument card 14. Depending upon the manner in which automated test process 20 is configured by the administrator (not shown) of automated test platform 10, these testing procedures may be repeated (to produce multiple identical test runs) or varied (to produce differing test runs). These various testing procedures may be sequenced by automated test process 20 via the event interface (e.g., event interfaces 66, 156). Specifically, automated test process 20 may provide timing and/or sequencing signals to the various components of automated test platform 10 through event interfaces 66, 156 in conjunction with interface 108 included within PCIe-based event fabric 18.

Once the automated test process 20 has been executed and the collection of captured test data 70 is complete, instrument card 14 may provide captured test data 70 to CPU subsystem 12 for processing. Instrument card 14 may accomplish this transfer of captured test data 70 to CPU subsystem 12 via DMA engine 68 by writing captured test data 70 directly to the memory system (not shown) accessible by CPU subsystem 12.

In the event that captured test data 70 is of considerable size (or the loading of CPU subsystem 12 is concerning), instrument card 14 may provide captured test data 70 to DSP card 16 for processing. Instrument card 14 may accomplish this transfer of captured test data 70 to DSP card 16 via DMA engine 68 by writing captured test data 70 directly to a memory system (not shown) accessible by DSP card 16. Alternatively, DSP card 16 may obtain captured test data 70 via DMA engine 158 by reading captured test data 70 directly from the memory system (not shown) accessible by instrument card 14.

DSP card 16 may then process captured test data 70 to generate result set 160 which may be stored within the memory subsystem (not shown) accessible by DSP card 16. Once this processing is complete, DSP card 16 may provide result set 160 to CPU subsystem 12. DSP card 16 may accomplish this transfer of result set 160 to CPU subsystem 12 via DMA engine 158 by writing result set 160 directly to the memory system (not shown) accessible by CPU subsystem 12.

Figure 5:
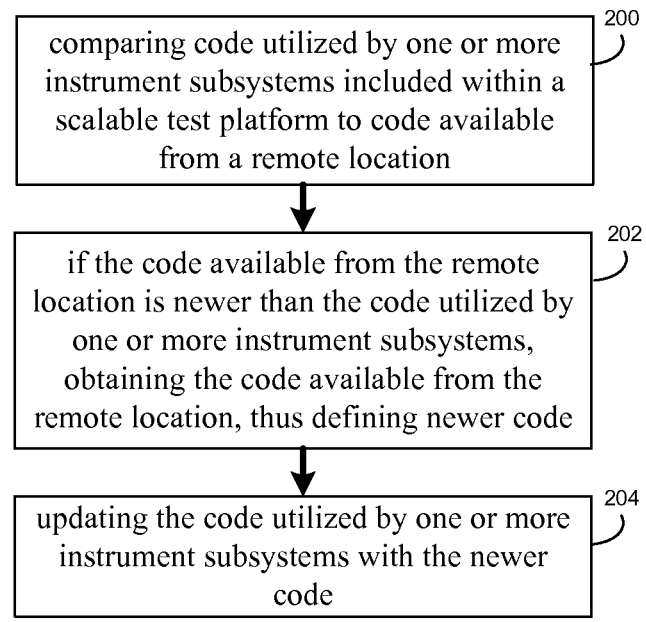
FIG. 5 is a flowchart of an automated test process 20 executed by the automated test platform of FIG. 1.

Updates:

Referring also to FIG. 5, automated test platform 10 generally (and automated test process 20 specifically) may be configured to perform an automated configuration/update/maintenance process to ensure that the various components of automated test platform 10 are up-to-date. For example, upon the occurrence of a computer-related event, automated test process 20 may compare 200 code utilized by one or more subsystems (e.g., code 72 for instrument card 14 and/or code 162 for DSP card 16) included within automated test platform 10 to code (e.g., code 114) available from a remote location (e.g., a remote website located on network 24).

Concerning the above-described computer-related event, examples may include but are not limited to the occurrence of a booting procedure and the occurrence of an update procedure. For example, automated test process 20 may perform maintenance each time that e.g., CPU subsystem 12 is booted. Alternatively/additionally, automated test process 20 may perform maintenance each time that an update procedure is initiated by an administrator (not shown) of automated test platform 10.

Concerning the code (e.g., code 72, 162) utilized by the one or more subsystems and the code (e.g., code 114) available from the remote location (e.g., a remote website located on network 24), example of such code may include but are not limited to firmware code (e.g., for updating the BIOS of a subsystem) and/or driver code (e.g., for updating the drivers used to access a subsystem).

If the code (e.g., code 114) available from the remote location (e.g., a remote website located on network 24) is newer than the code (e.g., code 72, 162) utilized by the one or more subsystems, automated test process 10 may obtain 202 the code available from the remote location (e.g., a remote website located on network 24), thus defining newer code. Examples of such newer code may include but are not limited to a firmware update and a driver update for one or more of the subsystems of automated test platform 10.

Once obtained 202, automated test process 20 may update 204 the code utilized by the subsystems (e.g., code 72 for instrument card 14 and/or code 162 for DSP card 16) with the newer code via loader interface 64, 154. For example, automated test process 20 may utilize loader interface 64, 154 to provide (via PCIe-based event fabric 18) the new code to update the firmware and/or the drivers of the various subsystems of automated test platform 10.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:
    upon the occurrence of a computer-related event, comparing code utilized by one or more subsystems included within a scalable test platform to code available from a remote location, wherein the scalable test platform includes a PCIe-based event fabric, one or more CPU subsystems coupled to the PCIe-based event fabric and configured to execute an automated test process, and one or more instrument subsystems coupled to the PCIe-based event fabric and configured to interface one or more devices under test;
    if the code available from the remote location is newer than the code utilized by the one or more subsystems, obtaining the code available from the remote location, thus defining newer code; and
    updating the code utilized by the one or more subsystems with the newer code.

2. The computer-implemented method of claim 1 wherein the computer-related event includes the occurrence of a booting procedure.

3. The computer-implemented method of claim 1 wherein the computer-related event includes the occurrence of an update procedure.

4. The computer-implemented method of claim 1 wherein the newer code includes a firmware update for the one or more subsystems.

5. The computer-implemented method of claim 1 wherein the newer code includes a driver update for the one or more subsystems.

6. The computer-implemented method of claim 1 wherein obtaining the code available from the remote location includes obtaining the code from a remote website via the internet.

7. A computer program product residing on a computer readable medium having a plurality of instructions stored thereon which, when executed by a processor, cause the processor to perform operations comprising:
    upon the occurrence of a computer-related event, comparing code utilized by one or more subsystems included within a scalable test platform to code available from a remote location, wherein the scalable test platform includes a PCIe-based event fabric, one or more CPU subsystems coupled to the PCIe-based event fabric and configured to execute an automated test process, and one or more instrument subsystems coupled to the PCIe-based event fabric and configured to interface one or more devices under test;
    if the code available from the remote location is newer than the code utilized by the one or more subsystems, obtaining the code available from the remote location, thus defining newer code; and
    updating the code utilized by the one or more subsystems with the newer code.

8. The computer program product of claim 7 wherein the computer-related event includes the occurrence of a booting procedure.

9. The computer program product of claim 7 wherein the computer-related event includes the occurrence of an update procedure.

10. The computer program product of claim 7 wherein the newer code includes a firmware update for the one or more subsystems.

11. The computer program product of claim 7 wherein the newer code includes a driver update for the one or more subsystems.

12. The computer program product of claim 7 wherein obtaining the code available from the remote location includes obtaining the code from a remote website via the internet.

13. A computing system including at least one processor and at least one memory architecture coupled with the at least one processor, wherein the computing system is configured to perform operations comprising:
    upon the occurrence of a computer-related event, comparing code utilized by one or more subsystems included within a scalable test platform to code available from a remote location, wherein the scalable test platform includes a PCIe-based event fabric, one or more CPU subsystems coupled to the PCIe-based event fabric and configured to execute an automated test process, and one or more instrument subsystems coupled to the PCIe-based event fabric and configured to interface one or more devices under test;

if the code available from the remote location is newer than the code utilized by the one or more subsystems, obtaining the code available from the remote location, thus defining newer code; and updating the code utilized by the one or more subsystems with the newer code.

14. The computing system of claim 13 wherein the computer-related event includes the occurrence of a booting procedure.

15. The computing system of claim 13 wherein the computer-related event includes the occurrence of an update procedure.

16. The computing system of claim 13 wherein the newer code includes a firmware update for the one or more subsystems.

17. The computing system of claim 13 wherein the newer code includes a driver update for the one or more subsystems.

18. The computing system of claim 13 wherein obtaining the code available from the remote location includes obtaining the code from a remote website via the internet.

\* \* \* \* \*